US007599784B2

(12) United States Patent
Ishizuka et al.

(10) Patent No.: US 7,599,784 B2
(45) Date of Patent: Oct. 6, 2009

(54) FUEL INJECTION SYSTEM LEARNING AVERAGE OF INJECTION QUANTITIES FOR CORRECTING INJECTION CHARACTERISTIC OF FUEL INJECTOR

(75) Inventors: Koji Ishizuka, Aichi-ken (JP); Kouichi Sugiyama, Chiryu (JP); Tetsuya Ohno, Kiyosu (JP); Manabu Tsujimura, Anjo (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 12/212,994

(22) Filed: Sep. 18, 2008

(65) Prior Publication Data

US 2009/0082946 A1 Mar. 26, 2009

(30) Foreign Application Priority Data

Sep. 20, 2007 (JP) ............................ 2007-243828

(51) Int. Cl.
*B60T 7/12* (2006.01)
*F02D 41/00* (2006.01)

(52) U.S. Cl. ...................... 701/104; 701/105; 701/115; 123/674

(58) Field of Classification Search ................. 701/101, 701/103, 104, 105, 114, 115; 123/434, 673, 123/674
See application file for complete search history.

(56) References Cited

U.S. PATENT DOCUMENTS

| | | | | |
|---|---|---|---|---|
| 6,705,294 | B2 * | 3/2004 | Shinogle | 123/486 |
| 6,988,030 | B2 | 1/2006 | Asano et al. | |
| 6,990,950 | B2 * | 1/2006 | Asano et al. | 123/299 |
| 2004/0099054 | A1 * | 5/2004 | Shinogle | 73/119 A |
| 2004/0267434 | A1 * | 12/2004 | Asano et al. | 701/104 |
| 2005/0061299 | A1 * | 3/2005 | Leman et al. | 123/486 |
| 2008/0017173 | A1 * | 1/2008 | Fujii | 123/478 |

FOREIGN PATENT DOCUMENTS

| | | |
|---|---|---|
| DE | 10 2005 052 024 | 5/2006 |
| EP | 0 947 684 | 10/1999 |
| EP | 1 340 900 | 9/2003 |
| EP | 1 854 988 | 11/2007 |
| JP | 2005-155360 | 6/2005 |

OTHER PUBLICATIONS

Extended European Search Report dated Feb. 11, 2009, issued in corresponding European Application No. 08164685.3-2311.

* cited by examiner

*Primary Examiner*—John T Kwon
(74) *Attorney, Agent, or Firm*—Nixon & Vanderhye, PC

(57) ABSTRACT

A fuel injection system designed to execute a learning operation to spray fuel through a fuel injector in a cycle to calculate an average of actual injection quantities for correcting an injection duration so as to minimize a deviation of the average from a target quantity. The system samples the actual injection quantities for a given period of time made up of a first and a second time section. In each of the first and second time sections, the system decides whether each of the actual injection quantities is suitable for use in calculating the average or not. When a desired number of the actual injection quantities decided to be suitable for the calculation of the average has been derived in the first time section, the system proceeds to the second time section to calculate the average. This enhances the accuracy in determining the quantity of fuel actually sprayed from the fuel injector.

13 Claims, 3 Drawing Sheets

FUEL INJECTION SYSTEM LEARNING AVERAGE OF INJECTION QUANTITIES FOR CORRECTING INJECTION CHARACTERISTIC OF FUEL INJECTOR

CROSS REFERENCE TO RELATED DOCUMENT

The present application claims the benefit of Japanese Patent Application No. 2007-243828 filed on Sep. 20, 2007, the disclosure of which is incorporated herein by reference.

BACKGROUND OF THE INVENTION

1. Technical Field of the Invention

The present invention relates generally to a fuel injection system which may be employed with automotive internal combustion engines to learn the quantity of fuel actually sprayed by a fuel injector for correcting an on duration or injection duration for which the fuel injector is to be opened to spray the fuel desirably, and more particularly to such a fuel injection system designed to learn an average of injection quantities for correcting the injection duration.

2. Background Art

There are known fuel injection systems for automotive internal combustion engines which are designed to instruct a fuel injector spray a target quantity of fuel to learn the quantity of fuel actually sprayed (will also be referred to as an actual injection quantity below) and correct an injection duration based on a deviation of the actual injection quantity from the target quantity. For example, Japanese Patent First Publication No 2005-155360 proposes such an injection quantity learning system. This system works to execute an injection quantity learning operation when the engine is decelerating and no fuel is being sprayed into the engine and calculate the actual injection quantity based on a change in speed of the engine arising from the spraying of fuel thereinto. The system instructs the fuel injector to spray the fuel in a cycle and determines an average of sequentially calculated actual injection quantities for use in comparison with the target quantity.

A change in speed of the engine proceeding from, for example, undulations of the road surface will result in an undesirable variation in the actual injection quantity, as calculated. This leads to the instability of accuracy in calculating the average of the actual injection quantities for use in the comparison with the target quantity.

SUMMARY OF THE INVENTION

It is therefore a principal object of the invention to avoid the disadvantages of the prior art.

It is another object of the invention to provide a fuel injection system which is designed to ensure the accuracy in determining an average of quantities of fuel sprayed for learning an injection characteristic of a fuel injector.

According to one aspect of the invention, there is provided a fuel injection system for an internal combustion engine which may be employed with an automotive common rail fuel injection system. The fuel injection system comprises: (a) a fuel injector which works to spray fuel into an internal combustion engine; and (b) an injection controller working to initiating an injection quantity learning operation to perform an injection quantity determining function in a cycle which instructs the fuel injector spray the fuel and determine actual injection quantities in sequence that are quantities of the fuel expected to have been sprayed actually from the fuel injector for a given period of time made up of a first time section and a second time section following the first time section.

The injection controller also performs an average calculating function and an injection quantity-use decision function. The average calculating function is to calculate in the second time section an average of the actual injection quantities, as determined by the injection quantity determining functions for learning an injection characteristic of the fuel injector. The injection quantity-use decision function is to make decisions in the first and second time sections, respectively, as to whether each of the actual injection quantities is suitable for use in calculating the average through the average calculating function or not.

The injection quantity-use decision function decides in the first time section whether a variation in each of the actual injection quantities lies within a given allowable variation range or not. When the variation in one of the actual injection quantities is determined as being lying within the allowable variation ranges the injection quantity-use decision function decides that the one of the actual injection quantities is suitable for use in calculating the average. When the number of the actual injection quantities having been decided as being suitable for use in calculating the average has reached a given value, the injection quantity-use decision function initiates the decision in the second time section.

When one of the actual injection quantities is out of a given allowable quantity range defined around the average of others of the actual injection quantities, the injection quantity-use decision function excludes the one from calculating the average through the average calculating function.

In the preferred mode of the invention, the given value used by the injection quantity-use decision function in determining whether the decision in the second time section is to be initiated or not may be set as a function of pressure of the fuel when the injection quantity determining function initiates to determine the actual injection quantities.

A standard deviation is used as the variation in each of the actual injection quantities for comparison with the given allowable variation range in the first time section.

When the variation in one of the actual injection quantities is decided to lie out of the given allowable variation range in the first time section, the injection controller decides that the injection quantity determining function should be re-executed to instruct the fuel injector spray the fuel in a subsequent cycle and re-executes the injection quantity determining function to determine an actual injection quantity again. The injection quantity-use decision function makes the decision on the actual injection quantity, as determined in the subsequent cycle, in the first time section.

When the number of times the injection controller has decided in the first time section to re-execute the injection quantity determining function has reached a given value, the injection controller may halt the injection quantity learning operation.

The allowable variation range may be set as a function of the number of the actual injection quantities, as derived by the injection quantity determining function.

In the second time section, the injection quantity-use decision function decides whether a last derived one of the actual injection quantities is out of the allowable quantity range defined around the average of previously derived ones of the actual injection quantities or not. When the last derived one is decided as being out of the allowable quantity range, the injection quantity-use decision function excludes the last derived one from calculating the average through the average calculating function.

The allowable quantity range is set as a function of the number of the actual injection quantities, as derived by the injection quantity determining function.

When the number of times the injection quantity-use decision function has excluded the one from calculating the average through the average calculating function has reached a given value, the injection controller decides that the injection quantity determining function should be re-executed to instruct the fuel injector spray the fuel in a subsequent cycle and re-executes the injection quantity determining function to determine an actual injection quantity again. The injection quantity-use decision function makes the decision on the actual injection quantity, as determined in the subsequent cycle, in the first and second time sections.

When the number of times the injection controller has decided in the second time section to re-execute the injection quantity determining function has reached a given value, the injection controller halts the injection quantity leaning operation.

When the number of times the injection quantity-use decision function has excluded the one from calculating the average through the average calculating function in the second time section has reached a given value, the injection controller halts the injection quantity learning operation.

The injection controller may also perform a correction function which, after the second time section, calculates a deviation of the average from a target quantity of the fuel the injection quantity determining function has instructed the injector to spray the fuel for correcting an injection duration for which the fuel injector is to be opened so as to minimize the deviation.

The fuel injection system may further comprise a fuel supply pump equipped with a suction control valve which works to control a flow rate of the fuel to be pressurized and delivered by the fuel supply pump, and a common rail storing therein the fuel delivered from the fuel supply pump. The fuel injector works to spray the fuel, as supplied from the common rail, into the engine.

The above functions may be implemented by hardware resources, software resource, or combinations thereof. The functions may be achieved separately or in a single electric circuit.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings.

DESCRIPTION OF THE PREFERRED EMBODIMENTS

Figure 1:
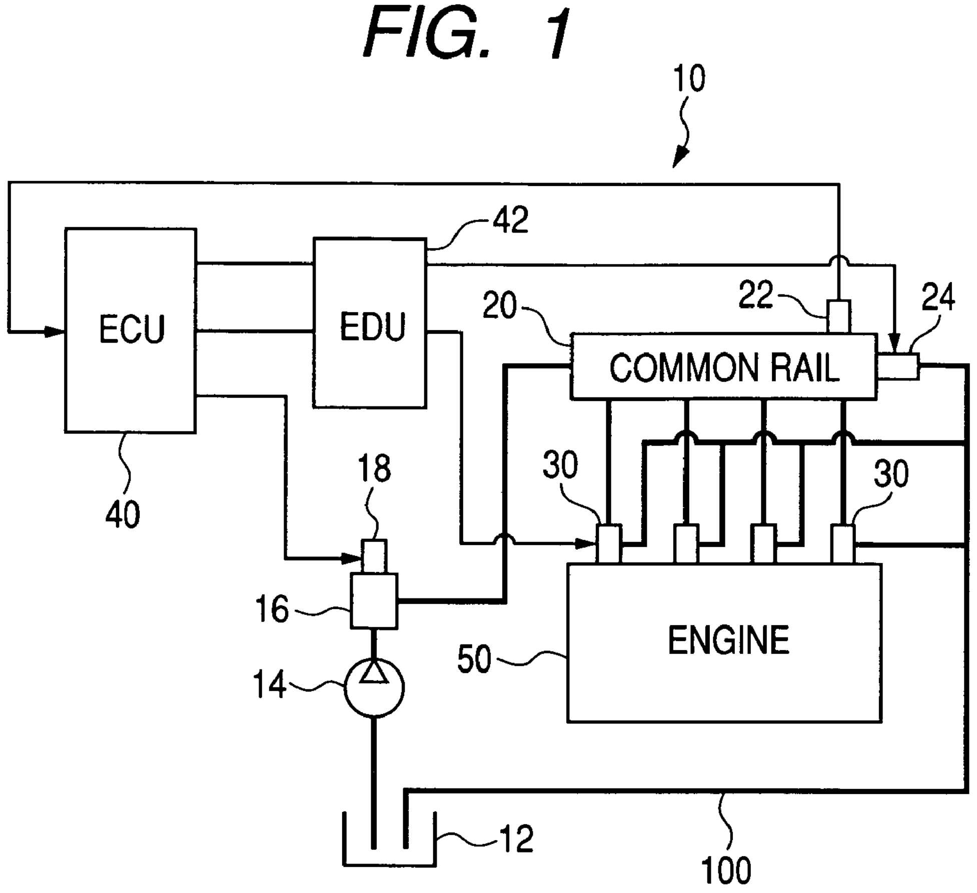
FIG. 1 is a block diagram which illustrates a fuel injection system according to the invention.

Referring to the drawings, particularly to FIG. 1, there is shown an accumulator fuel injection system 10 according to the invention.

The accumulator furl injection system 10 consists essentially of a feed pump 14, a high-pressure pump 16, a common rail 20, a pressure sensor 22, a pressure-reducing valve 24, fuel injectors 30, an electronic control unit (ECU) 40, and an electronic driving unit (EDU) 42. The accumulator fuel injection system 10, as referred to herein, is designed to supply fuel into each cylinder of, for example, an automotive four-cylinder diesel engine 50. For the sake of convenience, FIG. 1 illustrates only one signal line extending from the EDU 42 to one of the fuel injectors 30.

The feed pump 14 works to pump the fuel out of a fuel tank 12 and feed it to the high-pressure pump 16. The high-pressure pump 16 is of a typical structure in which a plunger is reciprocated following rotation of a cam of a camshaft of the diesel engine 50 to pressurize the fuel sucked into a pressure chamber thereof. The high-pressure pump 16 is equipped with a suction control valve 18.

The suction control valve 18 is disposed in a fuel path extending between an fuel inlet and the pressure chamber of the high-pressure pump 16. The suction control valve 18 is a solenoid-operated valve which works to change an open area in the fuel path through which the fuel flows into the pressure chamber as a function of a value of current supplied thereto. The ECU 40 controls the duty cycle of the current to be supplied to the suction control valve 18 to regulate the flow rate of fuel to be sucked from the feed pump 14 into the high-pressure pump 16 when the plunger of the high-pressure pump 16 is in a suction stroke.

The common rail 20 works as a fuel accumulator which stores therein the fuel fed from the high-pressure pump 16 and keeps it at a pressure selected based on an operating conditions of the diesel engine 50. The pressure of fuel in the common rail 20 (which will also be referred to as a common rail pressure below) is controlled by a balance between the amount of fuel fed by the high-pressure pump 16 and that drained by the pressure-reducing valve 24. The pressure sensor 22 measures the common rail pressure and output a signal indicative thereof to the ECU 40.

When opened, the pressure-reducing valve 24 drains the fuel out of the common rail 20 into a return pipe 100 to reduce the pressure in the common rail 20. The pressure-reducing valve 24 may be implemented by a typical solenoid valve equipped with a spring, a valve member, and a coil. The spring urges the valve member to a closed position at all times. When energized, the coil produces a magnetic attraction to lift the valve member up to an open position to drain the fuel out of the common rail 20. An on-duration for which the pressure-reducing valve 24 is kept opened is controlled by the width of a pulse current supplied to the coil thereof. The greater the width of the pulse current, the longer the on-duration.

The fuel injectors 30 are installed one in each of the cylinders of the diesel engine 40. Each of the fuel injectors 30 works to spray the fuel stored in the common rail 20 into one of the cylinders of the diesel engine 50. Each of the fuel injectors 30 is controlled in operation by the EDU 42 to perform a sequence of multiple injections of fuel such as the pilot injection, the main injection, and the post injection in every engine operating cycle (i.e., a four-stroke cycle) including intake or induction, compression, combustion, and exhaust. Each of the fuel injectors 30 is a typical solenoid-operated valve in which the pressure of fuel in a control chamber is regulated by the EDU 42 to move a nozzle needle to control the quantity of fuel to be sprayed into the diesel engine 50.

The ECU 40 is implemented by a typical microcomputer made up of a CPU, a ROM, a RAM, and a non-volatile memory such as an EEPROM. The ECU 50 samples outputs from an accelerator position sensor (not shown) working to measure the position ACC of an accelerator pedal (i.e., an open position of a throttle valve), a temperature sensor (not shown), the pressure sensor 22, and a speed sensor NE (not shown) working to measure the speed of the diesel engine 50 to determine the operating condition of the diesel engine 50. The ECU 40 controls the energization of the suction control valve 18, the pressure-reducing valve 24, and the fuel injectors 30 to bring the operating condition of the diesel engine 50 to a desired state.

The ECU 40 stores in the ROM or the EEPROM a discharge characteristic map which lists a relation between the duty cycle of the pulse current to drive the suction control valve 18 and the amount of fuel to be discharged by the high-pressure pump 16. The ECU 40 monitors the pressure in the common rail 20, as measured by the pressure sensor 22, and controls the energization of the suction control valve 18 by look-up using the discharge characteristic map so as to bring the pressure in the common rail 20 into agreement with a target level in a feedback control mode.

The ECU 40 also works to monitor the engine operating conditions, as derived by the outputs from the pressure sensor 22, etc. to control the injection timing and injection duration for each of the fuel injectors 30. Specifically, the ECU 40 outputs an injection control signal in the form of a pulse (will also be referred to an injection pulse signal below) to the EDU 42 to instruct one of the fuel injectors 30 to spray a target quantity of fuel at a selected injection timing. The ECU 40 stores therein an injection quantity-to-pulse width map which lists relations between the pulse width of the injection pulse signal and the quantity of fuel to be sprayed from the fuel injectors 30, one for each of predefined levels of the pressure of fuel in the common rail 20.

The EDU 42 is responsive to control signals outputted from the ECU 40 to produce a drive current or a drive voltage to be supplied to the pressure-reducing valve 24 and the fuel injectors 30.

The ECU 40 executes a control program, as will be discussed later in detail, stored in the ROM or the EEPROM to perform following functions.

Learning Condition Determining Function

The ECU 40 determines whether an injection quantity learning condition in which the diesel engine 50 is decelerating, and no fuel is being sprayed into the diesel engine 50 is met or not for initiating an injection quantity learning operation, as will be described later in detail. When the injection quantity learning condition is met, the ECU 40 enters an injection quantity learning mode to execute the injection quantity learning operation in a cycle which instructs a selected one of the fuel injectors 30 to spray a single shot of fuel.

Actual Injection Quantity Determining Function

When the injection quantity learning condition is met, and a selected one of the fuel injectors 30 is instructed to spray a single Jet of fuel, the ECU 40 samples the speed of the diesel engine 50, as measured by the speed sensor NE, to calculate an output torque of the diesel engine 50. The ECU 40 mathematically converts the output torque into the quantity of fuel expected to have been sprayed actually from the fuel injector 30 (which will also be referred to as an actual injection quantity below).

Average Calculating Function

The ECU 40 works to calculate an integral average (also called an integration mean value) of the actual injection quantities, as calculated in sequence in the injection quantity learning mode. The ECU 40 also determines whether each of the actual injection quantities should be used or suitable for use in calculating the integral average or not. This determination is made by a function, as discussed below.

Injection Quantity-Use Decision Function

The ECU 40 determines whether each of the actual injection quantities should be used in calculating the average thereof through the average calculating function or not. A decision time period in which such a decision is made is broken down into two time sections: a first time section and a second time section. The first time section is a time frame for the number of the actual injection quantities, as derived, to exceed a given decision criterion value. The second time section is a time frame elapsing after the number of the actual injection quantities exceeds the given value.

The decision criterion value dividing the decision time period into the first and second time sections is selected as a function of pressure of the fuel to be sprayed into the diesel engine 50 (i.e., the pressure in the common rail 20) when the actual injection quantity is calculated or by look-up using a map listing pressures of the fuel. Specifically, the decision criterion value is set in view of a variation in the actual injection quantity depending upon the pressure of the fuel to be sprayed into the diesel engine 50. For example, when the pressure of the fuel is higher, it usually results in an increased variation in the actual injection quantity. Conversely, when the pressure of the fuel is lower, it usually results in a decreased variation in the actual injection quantity. The decision criterion value is, therefore, increased with an increase in the pressure of the fuel.

The decision criterion value may be changed as a function of a travel distance or a drive time of an automotive vehicle in which the fuel injection system 10 is installed, the number of times the injection quantity learning condition is encountered, and/or the number of times an ignition switch is turned on or off.

The first and second time sections of the decision time period in which it is determined whether the actual injection quantities should be used in calculating the average thereof or not will be described below in detail First Time Section In the first time section, the ECU 40 determines whether a variation in the actual injection quantity, as calculated, lies within a given range, as will be discussed below in detail, or not. The variation is expressed by a standard deviation in this embodiment.

Figure 2:
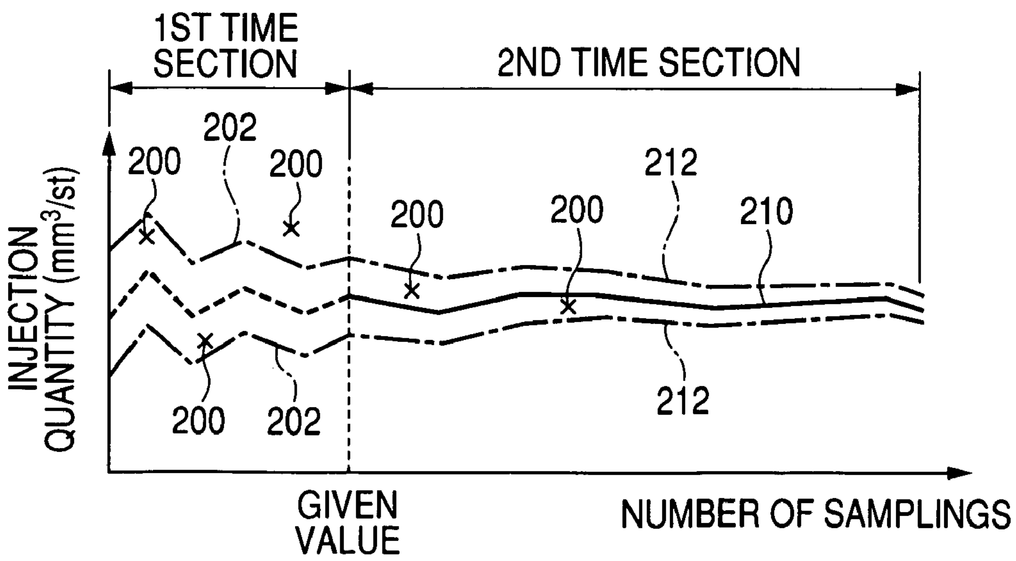
FIG. 2 is a view which demonstrates how to determine an average of actual injection quantities for correcting an injection characteristic of a fuel injector.

The allowable variation range 202, as illustrated in FIG. 2, within which it is determined whether the variation in the actual injection quantity 200 lies or not in the first time section is preferably determined by the number of samplings (i.e., the number of the actual injection quantities 200). For instance, the allowable variation range 202 may be selected by look-up using a map of relations between the size of the allowable variation range 202 and the number of the samplings. It has been found that an increase in the number of samplings results in a decrease in variation in the actual injection quantity. Therefore, when the number of the actual injection quantities 200, as derived in the injection quantity learning operation, is small, the allowable variation range 202 is set wide. The allowable variation range 202 is set narrower as the number of the actual injection quantities 200 increases.

The ECU 40 may determine the allowable variation range 202 each execution of the injection quantity learning operation as a function of a travel distance or a drive time of the automotive vehicle in which the fuel injection system 10 is installed, the number of times the injection quantity learning condition is encountered, and/or the number of times the ignition switch is turned on or off.

When a variation in each of the actual injection quantities 200 is in the allowable variation range 202, and the number of the actual injection quantities 200 which have been determined as being within the allowable variation range has exceeded the given decision criterion value, the ECU 40 starts to decide in the second time section whether each of the actual injection quantities should be used in calculating the average thereof or not.

Specifically, as demonstrated in FIG. 2, when any of the actual injection quantities 200, as calculated until the number of the actual injection quantities 200 exceeds the decision criterion value, has fallen out of the allowable variation range 202, the ECU 40 discards the actual injection quantities, as derived so far, and restarts to sample the actual injection quantity in a cycle and make the above the above decision on each of the actual injection quantities, as derived subsequently. This prevents the actual injection quantities which are out of the allowable variation range from being used in calculating the average of the actual injection quantities in the second time section, thus ensuring the accuracy in calculating the average of the actual injection quantities.

When the number of the re-decisions of whether the actual injection quantities are in the allowable variation range or not has reached a given value, the ECU 40 concludes that it is impossible to acquire correct data on the quantity of fuel actually sprayed from a selected one of the fuel injectors 30 in this execution of the injection quantity learning operation and stops the injection quantity learning operation.

Second Time Section

The ECU 40 works to calculate an average value 210 of the actual injection quantities 200, as derived from the first time section until immediately before the most recently derived actual injection quantity 200. The ECU 40 determines whether the most recently derived actual injection quantity 200 is within an allowable quantity range 212 defined around the average value 210 or not.

If the most recently derived actual injection quantity 200 lies within the allowable quantity range 212, the ECU 40 calculates the average 210 of the actual injection quantities 200 including the most recently derived one. Alternatively, if the most recently derived actual injection quantity 200 lies out of the allowable quantity range 212, the ECU 40 excludes the most recently derived actual injection quantity 200 from data used to calculate the average value 210. This prevents one of the sequentially derived actual injection quantities 200 which is greatly different from the average value 210 from being used in updating the average value 210 in the second time section.

The allowable quantity range 212, as used to determine the most recently derived actual injection quantity 200 should be used to update the average value 210 or not, is preferably determined as a function of the number of the actual injection quantities 200 immediately preceding the most recently derived actual injection quantity 200. It has been found that an increase in the number of times the actual injection quantity 200 is calculated results in a decrease in deviation of a last one of the actual injection quantities 200 from the average value 210. Consequently, the allowable quantity range 212 is set narrower, as demonstrated in FIG. 2, as the number of the actual injection quantities 200, as calculated increases.

The ECU 40 may determine the allowable quantity range 212 each execution of the injection quantity learning operation as a function of a travel distance or a drive time of the automotive vehicle in which the fuel injection system 10 is installed, the number of times the injection quantity learning condition is encountered, and/or the number of times the ignition switch is turned on or off.

When the number of times the last one of the sequence of the actual injection quantities 200 has been excluded from calculating or updating the average value 210 has reached a given value, the ECU 40 returns back to the first time section, rests spraying the fuel from a selected one the fuel injectors 30 to calculate the actual injection quantity again, and makes the above decisions on it over the first and second time sections. This prevents the actual injection quantities 200 which are out of the allowable quantity range 212 from being used in updating the average value 210 of the actual injection quantities 200 in the second time section, thus ensuring the accuracy in calculating the average value 210 of the actual injection quantities 200.

When the number of the above re-decisions on the actual injection quantities has reached a given value, the ECU 40 concludes that it is impossible to acquire correct data on the quantity of fuel actually sprayed from a selected one of the fuel injectors 30 in this execution of the injection quantity learning operation and stops or halts the injection quantity learning operation.

When a deviation of the most recently derived actual injection quantity 200 from the average value 210 of the previously derived actual injection quantities 200 has fallen in a given convergent range a given number of times continuously, the ECU 40 halts the above decision on each of the actual injection quantities in the second time section and execute a correcting operation, as will be described below in detail.

Additionally, when the average value 210 of the actual injection quantities 200 including the most recently derived one is out of a given threshold range, the ECU 40 determines that the average is unacceptable for learning the injection characteristic of the fuel injector 30 and halts the injection quantity learning operation. The given threshold range is set as a function of the pressure in the common rail 20.

Correcting Function

When the deviation of the most recently derived actual injection quantity 200 from the average value 210 of the previously derived actual injection quantities 200 has fallen in the given convergent range a given number of times continuously, the ECU 40 terminates the decision time period and calculate a deviation of the finally derived average value 210 from the target quantity the ECU 30 has instructed the fuel injector 30 spray the fuel. When such a deviation is greater than a given value, the ECU 40 corrects an injection characteristic map based on the deviation.

Figure 3:
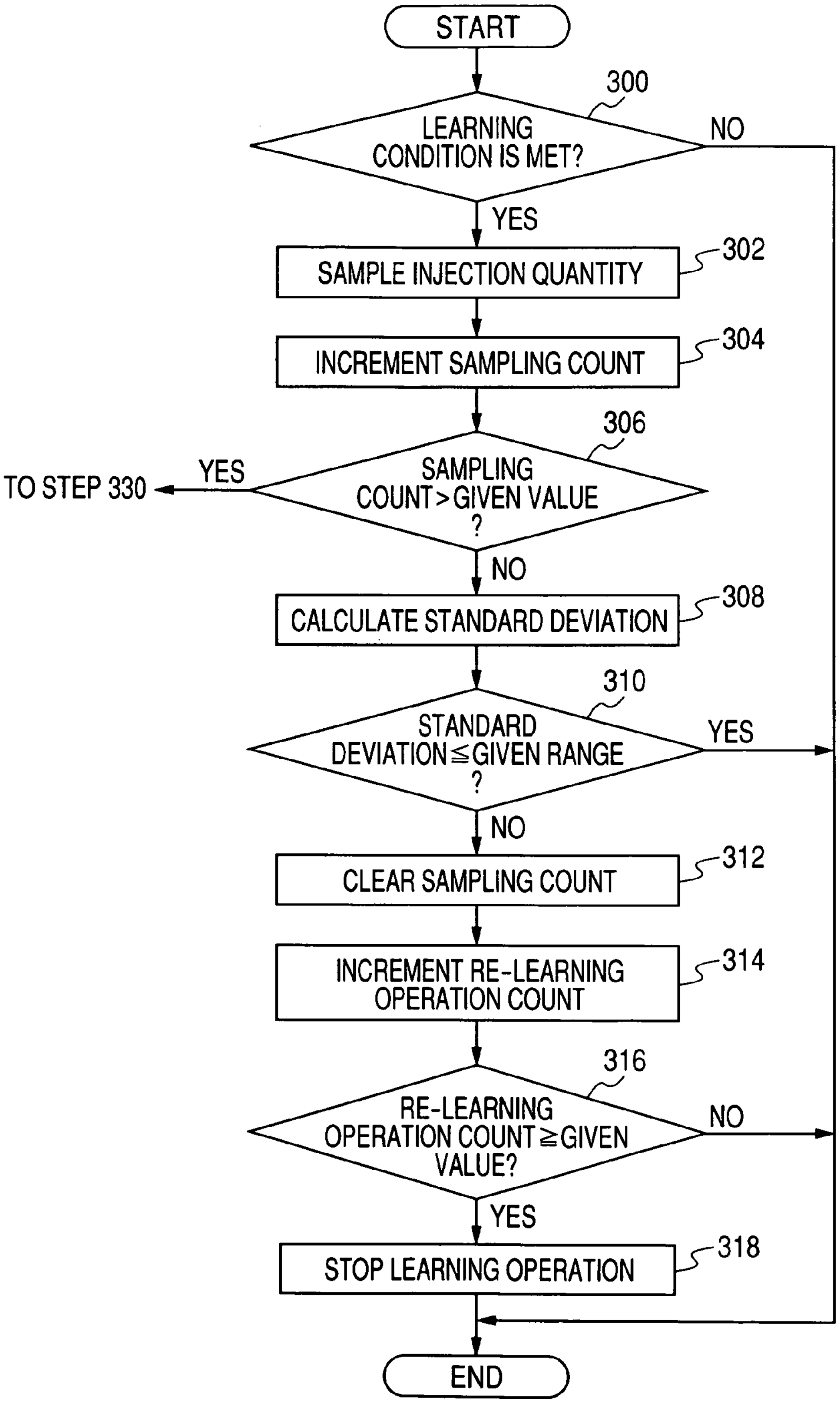
FIGS. 3 and 4 show a flowchart of an injection quantity learning program to be executed by the fuel injection system of FIG. 1 to determine the average of actual injection quantities in the manner, as demonstrated in FIG. 2.
Figure 4:
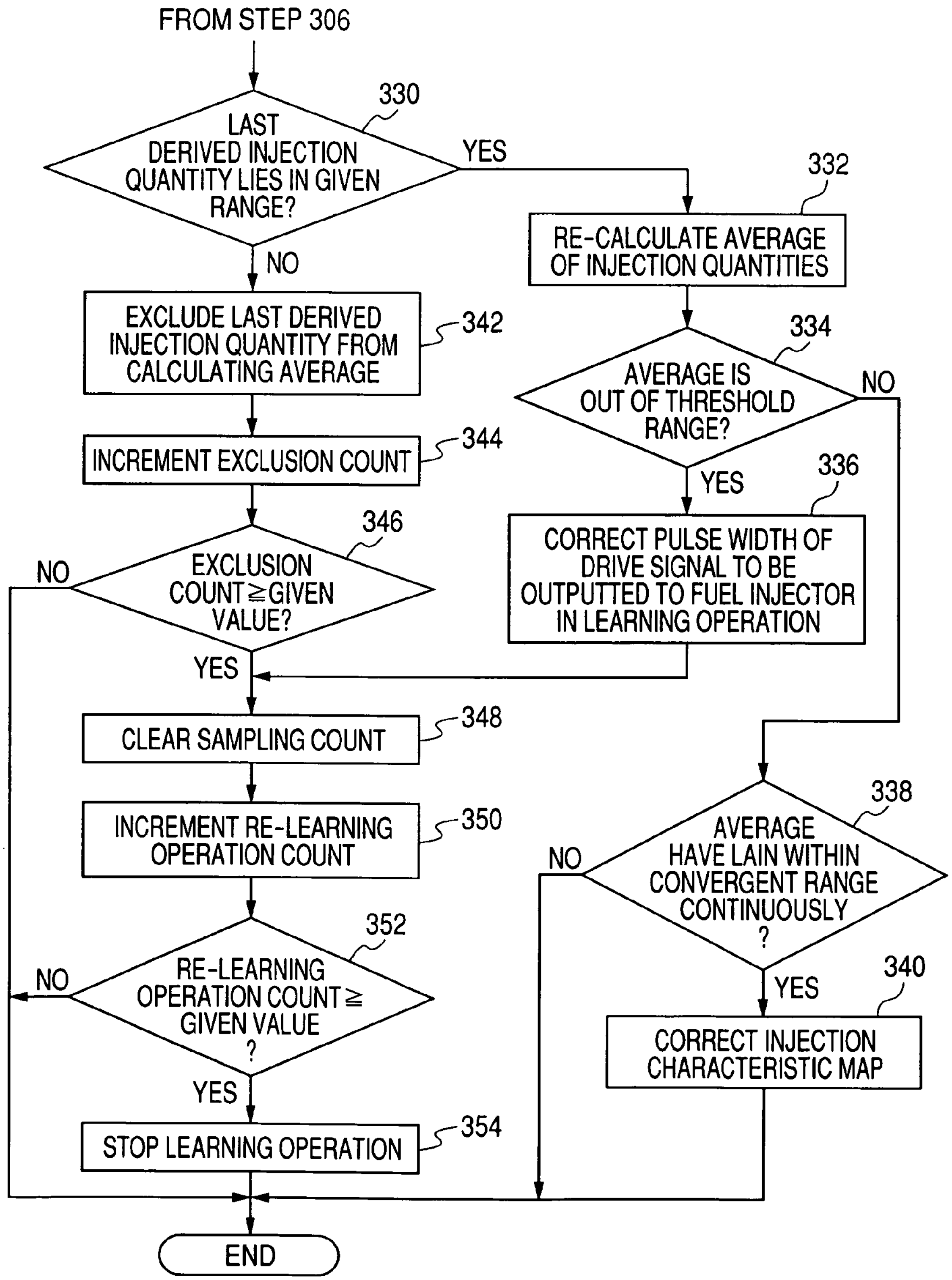

FIGS. 3 and 4 illustrate a flowchart of an actual injection quantity learning program to be executed by the ECU 40 at all times in a cycle for each of the fuel injectors 30. The part, as illustrated in FIG. 3, represents the operation of the ECU 40 in the first time section. The part, as illustrated in FIG. 4, represents the operation of the ECU 40 in the second time section.

After entering the program, the routine proceeds to step 300 wherein it is determined whether the injection quantity learning condition, as described above, is encountered or not. Specifically, it is determined whether the diesel engine 50 is decelerating, and no fuel is being injected into the diesel engine 50 or not. If a NO answer is obtained meaning that the injection quantity learning operation should not be initiated, then the routine terminates.

Alternatively, if a YES answer is obtained in step 300, then the routine proceeds to step 302 wherein the ECU 40 controls the flow rate of fuel to be outputted from the high-pressure pump 16 to bring the pressure in the common rail 20 into agreement with a level selected for the injection quantity learning operation and searches the pulse width of the drive signal from the injection quantity characteristic map which is to be outputted to one of the fuel injectors 30 selected in this program cycle and required to instruct the fuel injector 30 to spray a target small quantity of fuel selected as a function of the pressure in the common rail 20. The ECU 40 outputs the drive signal to the fuel injector 30 to spray the fuel into the diesel engine 50 and samples a resulting change in speed of the diesel engine 50 to calculate the quantity of fuel expected to have been sprayed actually from the fuel injector 30 (i.e., the actual injection quantity) in the manner, as described above.

The routine proceeds to step 304 wherein an injection quantity sampling count that represents the number of the actual injection quantities, as derived so far, is incremented by one (1). The routine proceeds to step 306 wherein it is determined whether the injection quantity sampling count is greater than a given value (i.e., the decision criterion value, as described above) or not. If a NO answer is obtained meaning that the number of the actual injection quantities, as derived so far, is smaller than the given value, it is concluded that a determination should be made in the first time section as to whether the actual injection quantity, as derived last, is suitable for use in calculating the average of the actual injection quantities, as derived so far, or not. Alternatively, if a YES answer is obtained, it is concluded that the routine should proceed to the second time section.

Specifically, if a NO answer is obtained in step 306, then the routine proceeds to step 308 wherein a standard deviation of the actual injection quantity is calculated. The routine proceeds to step 310 wherein it is determined whether the standard deviation is within a given allowable range (i.e., the allowable variation range, as described above) or not. If a YES answer is obtained meaning that the standard deviation lies in the given allowable range, then the routine terminates.

Alternatively, if a NO answer is obtained in step 310 meaning that the standard deviation is out of the given allowable range, then the routine proceeds to step 312 wherein the injection quantity sampling count is reset to zero (0). The routine proceeds to step 314 wherein a re-learning operation count representing the number of times it has been determined that the actual injection quantity should be recalculated, that is, re-learned in the first time section, in other words, the number of times it has been determined that a sequence of steps 300 to 312 should be performed to sample the actual injection quantity again is incremented by one (1).

The routine proceeds to step 316 wherein it is determined whether the relearning operation count in the first time section is greater than or equal to a given value or not. If a NO answer is obtained, the routine terminates. The ECU 40 then restarts this program from step 300 to learn the actual injection quantity again.

Alternatively, if a YES answer is obtained in step 316 concluding that it is impossible to sample the actual injection quantities correctly in this injection quantity learning mode, then the routine proceeds to step 318 wherein the injection quantity learning operation is halted. In this case, the ECU 40 may select a next one of the fuel injectors 30 and restart the actual injection quantity learning program of FIGS. 3 and 4 for the next one or start the actual injection quantity learning program for the same fuel injector 30 at a different level of the pressure of fuel in the common rail 20.

If a YES answer is obtained in step 306 meaning that the number of the actual injection quantities, as derived so far, has exceeded the given value, then the routine proceeds to step 330 in FIG. 4 wherein the average of the actual injection quantities (i.e. the averaged value 210 in FIG. 2), as derived immediately before the most recently derived actual injection quantity, in other words, the actual injection quantity, as calculated in the last execution cycle of step 320 in FIG. 3, is determined, and it is determined whether the most recently derived actual injection quantity lies within a given range (i.e., the allowable quantity range 212) defined around the average or not.

If a YES answer is obtained in step 330, then the routine proceeds to step 332 wherein the average of the previously derived actual injection quantities plus the most recently derived actual injection quantity is recalculated. The routine proceeds to step 334 wherein it is determined whether the average, as re-calculated in step 332, is out of a given threshold range or not. The threshold range is selected as a function of the pressure in the common rail 20.

If a YES answer is obtained in step 334 meaning that the average lies out of the threshold range, then the routine proceeds to step 336 wherein the pulse width of the drive signal to be outputted to the selected one of the fuel injectors 30 to spray the fuel subsequently is corrected based on a difference between the average, as calculated in step 3232, and the threshold range. Specifically, the ECU 40 corrects the injection duration for which the fuel injector 30 is kept opened in a subsequent event of injection of fuel into the diesel engine 50 in the injection quantity learning operation so as to bring the average to within the threshold range, for example. The routine then proceeds to step 348 which will be described later in detail.

If a NO answer is obtained in step 334 meaning that the average is within the threshold range, then the routine proceeds to step 338 wherein it is determined whether the average has continued to lie within a given convergent range a given number of times or not, in other words, whether the averages, as calculated continuously over a given number of cycles of step 332, have all lain within the convergent range or not. If a NO answer is obtained meaning that the actual injection quantity does not yet converge, then the routine terminates.

Alternatively, if a YES answer is obtained in step 338, then the routine proceeds to step 340 wherein the injection characteristic map is corrected based on a difference between the average, as calculated in step 332, and the target quantity of fuel the ECU 40 has instructed the fuel injector to spray.

If a NO answer is obtained in step 330 meaning that the most recently derived actual injection quantity lies out of the given range, then the routine proceeds to step 342 wherein the most recently derived actual injection quantity is excluded from calculating the average in step 332. The routine proceeds to step 344 wherein an exclusion count is incremented by one (1).

The routine proceeds to step 346 wherein it is determined whether the exclusion count is greater than or equal to a given value or not. If a NO answer is obtained, then the routine terminates. The ECU 40 then restarts this program from step 300 to learn the actual injection quantity again. Alternatively, if a YES answer is obtained in step 348 or after the average fails out of the threshold range in step 334, the routine proceeds to step 348 wherein the injection quantity sampling count is reset to zero (0). The routine proceeds to step 350 wherein the re-learning operation count representing the number of times it has been determined that the actual injection quantity should be re-calculated, that is, re-learned is incremented by one (1).

If the exclusion count is determined to have exceeded the given value in step 348, the ECU 40 may halt the injection quantity learning operation.

After step 350, the routine proceeds to step 352 wherein it is determined whether the re-learning operation count has reached a given value or not. If a NO answer is obtained, the routine terminates. The ECU 40 then restarts this program from step 300 to learn the actual injection quantity again.

Alternatively, if a YES answer is obtained in step 352 concluding that it is impossible to sample the actual injection quantities correctly in this injection quantity learning mode, then the routine proceeds to step 354 wherein the injection quantity learning operation is halted. In this case, the ECU 40 may select a next one of the fuel injectors 30 and restart the actual injection quantity learning program of FIGS. 3 and 4 for the next one or start the actual injection quantity learning program for the same fuel injector 30 at a different level of the pressure of fuel in the common rail 20.

As apparent from the above discussion, when the standard deviation of the actual injection quantity has fallen out of the allowable variation range, the ECU 40 does not proceed to the second time section in which it is determined whether the actual injection quantity is suitable for use in correcting the injection characteristic of a selected one of the fuel injectors 30 or not and relearns the actual injection quantity. This results in a decrease in variation in the actual injection quantity, as derived in the first time section, to enhance the accuracy in calculating the average of the actual injection quantities. In the second time section, when the last derived actual injection quantity is deviated from the average of the previously derived actual injection quantities by a given amount or more, the ECU 40 excludes the last derived actual injection quantity from calculating the average. The ECU 40 determines the average as the quantity of fuel actually sprayed from a selected one of the fuel injectors 30 to correct the injection duration for which the fuel injector 30 is to be kept opened so as to minimize a deviation of the quantity of fuel actually sprayed and a target quantity.

Instead of the standard deviation of the actual injection quantity used in the first time section to determine whether the actual injection quantity should be used to calculate the average of the actual injection quantities or not, a difference between a maximum and a minimum of the actual injection quantities may be used in the above determination.

While the present invention has been disclosed in terms of the preferred embodiment in order to facilitate better understanding thereof it should be appreciated that the invention can be embodied in various ways without departing from the principle of the invention. Therefore, the invention should be understood to include all possible embodiments and modifications to the shown embodiment which can be embodied without departing from the principle of the invention as set forth in the appended claims.

What is claimed is:

1. A fuel injection system for an internal combustion engine comprising:

a fuel injector which works to spray fuel into an internal combustion engine; and an injection controller working to initiating an injection quantity learning operation to perform an injection quantity determining function in a cycle which instructs said fuel injector spray the fuel and determine actual injection quantities in sequence that are quantities of the fuel expected to have been sprayed actually from said fuel injector for a given period of time made up of a first time section and a second time section following the first time section, said injection controller also performing an average calculating function and an injection quantity-use decision function, the average calculating function being to calculate in the second time section an average of the actual injection quantities, as determined by the injection quantity determining function, for learning an injection characteristic of said fuel injector, the injection quantity-use decision function being to make decisions in the first and second time sections, respectively, as to whether each of the actual injection quantities is suitable for use in calculating the average through the average calculating function or not, wherein the injection quantity-use decision function decides in the first time section whether a variation in each of the actual injection quantities lies within a given allowable variation range or not, when the variation in one of the actual injection quantities is determined as being lying within the allowable variation range, the injection quantity-use decision function decides that the one of the actual injection quantities is suitable for use in calculating the average, when the number of the actual injection quantities having been decided as being suitable for use in calculating the average has reached a given value, the injection quantity-use decision function initiating the decision in the second time section, and wherein when one of the actual injection quantities is out of a given allowable quantity range defined around the average of others of the actual injection quantities, the injection quantity-use decision function excludes the one from calculating the average through the average calculating function.

2. A fuel injection system as set forth in claim 1, wherein the given value used by the injection quantity-use decision function in determining whether the decision in the second time section is to be initiated or not is set as a function of pressure of the fuel when the injection quantity determining function initiates to determine the actual injection quantities.

3. A fuel injection system as set forth in claim 1, wherein a standard deviation is used as the variation in each of the actual injection quantities for comparison with the given allowable variation range in the first time section.

4. A fuel injection system as set forth in claim 1, wherein when the variation in one of the actual injection quantities is decided to lie out of the given allowable variation range in the first time section, said injection controller decides that the injection quantity determining function should be re-executed to instruct said fuel injector spray the fuel in a subsequent cycle and re-executes the injection quantity determining function to determine an actual injection quantity again, and wherein the injection quantity-use decision function makes the decision on the actual injection quantity, as determined in the subsequent cycle, in the first time section.

5. A fuel injection system as set forth in claim 4, wherein when the number of times said injection controller has decided in the first time section to re-execute the injection quantity determining function has reached a given value, said injection controller halts the injection quantity learning operation.

6. A fuel injection system as set forth in claim 1, wherein the allowable variation range is set as a function of the number of the actual injection quantities, as derived by the injection quantity determining function.

7. A fuel injection system as set forth in claim 1, wherein in the second time section, the injection quantity-use decision function decides whether a last derived one of the actual injection quantities is out of the allowable quantity range defined around the average of previously derived ones of the actual injection quantities or not, when the last derived one is decided as being out of the allowable quantity range, the injection quantity-use decision function excludes the last derived one from calculating the average through the average calculating function.

8. A fuel injection system as set forth in claim 1, wherein the allowable quantity range is set as a function of the number of the actual injection quantities, as derived by the injection quantity determining function.

9. A fuel injection system as set forth in clam 1, wherein when the number of times the injection quantity-use decision function has excluded the one from calculating the average through the average calculating function has reached a given value, said injection controller decides that the injection quantity determining function should be re-executed to instruct said fuel injector spray the fuel in a subsequent cycle and re-executes the injection quantity determining function to determine an actual injection quantity again, and wherein the injection quantity-use decision function makes the decision on the actual injection quantity, as determined in the subsequent cycle, in the first and second time sections.

10. A fuel injection system as set forth in claim 9, wherein when the number of times said injection controller has decided in the second time section to re-execute the injection quantity determining function has reached a given value, said injection controller halts the injection quantity learning operation.

11. A fuel injection system as set forth in claim 1, wherein when the number of times the injection quantity-use decision function has excluded the one from calculating the average through the average calculating function in the second time section has reached a given value, said injection controller halts the injection quantity learning operation.

12. A fuel injection system as set forth in claim 1, wherein said injection controller also performs a correction function which, after the second time section, calculates a deviation of the average from a target quantity of the fuel the injection quantity determining function has instructed said injector to spray the fuel for correcting an injection duration for which said fuel injector is to be opened so as to minimize the deviation.

13. A fuel injection system as set forth in claim 1, further comprising a fuel supply pump equipped with a suction control valve which works to control a flow rate of the fuel to be pressurized and delivered by the fuel supply pump, and a common rail storing therein the fuel delivered from said fuel supply pump, and wherein said fuel injector works to spray the fuel, as supplied from the common rail, into the engine.

* * * * *